US005750637A

United States Patent [19]
Takiguchi et al.

[11] Patent Number: 5,750,637
[45] Date of Patent: May 12, 1998

[54] PROCESS FOR THE PREPARATION OF A POLYCARBODIIMIDE SOLUTION

[75] Inventors: Yasuyuki Takiguchi; Ken Yahata; Yasuyoshi Komoto; Akira Hayashida; Minoru Takamizawa, all of Kanagawa-ken, Japan

[73] Assignee: Shin-Etsu Chemical Co., Ltd., Tokyo, Japan

[21] Appl. No.: 658,166

[22] Filed: Jun. 4, 1996

[30] Foreign Application Priority Data

Jun. 7, 1995 [JP] Japan .................................. 7-140144

[51] Int. Cl.[6] .......................... C08G 73/10; C08G 18/02
[52] U.S. Cl. .......................... 528/310; 528/126; 528/170; 528/322; 528/332; 528/353; 528/367; 525/419; 525/420
[58] Field of Search .................. 528/170, 126, 528/310, 322, 353, 332, 367; 525/419, 420

[56] References Cited

FOREIGN PATENT DOCUMENTS 2292316  3/1990  Japan .
5178954  7/1993  Japan .

OTHER PUBLICATIONS

Tod W. Campbell, et al "High Polymers Containing the Carbodiimide Repeat Unit" J. Org. Chem., pp. 2069-2075 Aug. 1963.

Donald J. Lyman, et al, "Polycarbodiimides and Their Derivatives", Die Maktomol. Chem. 67, pp. 1-9, Apr. 1963.

Primary Examiner—Patricia Hampton-Hightower
Attorney, Agent, or Firm—McAulay Fisher Nissen Goldberg & Kiel, LLP

[57] ABSTRACT

This invention provides a process for the preparation of a polycarbodiimide solution wherein the polycarbodiimide is synthesized by heating an organic diisocyanate (e.g., 2,4-tolylene diisocyanate or 2,6-tolylene diisocyanate) in the presence of a carbodiimidation catlayst characterized in that a non-chlorinated aromatic hydrocarbon is used as the solvent and the resulting polycarbodiimide has a number average molecular weight from about 3,000 to about 10,000; wherein the synthesis is performed in the temperature range of from about 100° to about 120° C.

7 Claims, 2 Drawing Sheets

PROCESS FOR THE PREPARATION OF A POLYCARBODIIMIDE SOLUTION

BACKGROUND OF THE INVENTION

1. Field of the Invention

This invention relates to a process for the preparation of polycarbodiimide in solution form by using a general-purpose non-chlorinated aromatic compound as solvent and controlling polymerization conditions. This invention can be utilized in various fields including, for example, the preparation of organic polycarbodiimide resins having high thermal resistance.

2. Description of the Related Art

A number of processes for the preparation of polycarbodiimide have been reported up to this time. According to T. W. Campbell et al. (J. Org. Chem., 28, 2069–2075, 1963), the desired product is obtained as a precipitate by using decalin, xylene or a mixture of xylene and dimethyl sulfoxide as solvent and carrying out the polymerization reaction at its reflux temperature. However, the polycarbodiimide obtained by this process is in an insoluble and infusible form and hence unsuitable for further processing.

On the other hand, according to Lyman et al. (Die Makromol. Chem., 67, 1, 1963), a film of polycarbodiimide is formed by carrying out the polymerization reaction at 120° C. for about 10 minutes in a solvent mixture composed of dimethyl sulfoxide and chlorobenzene (1:1) and casting the resulting viscous solution on a glass plate. However, the process of Lyman et al. has the disadvantage that, because of the short polymerization time, it is difficult to control the molecular weight and form a uniform film.

Amano et al. (Japanese Patent Provisional Publication No. 292316/1990) and Imashiro et al. (Japanese Patent Provisional Publication No. 178954/1993) have disclosed that polycarbodiimide can be obtained in the form of a stable solution by using a chlorinated aliphatic hydrocarbon (e.g., tetrachloroethylene or trichloroethylene) or an alicyclic ether (e.g., tetrahydrofuran or dioxane) as the polymerization solvent.

However, chlorinated aliphatic solvents such as tetrachloroethylene and trichloroethylene are problematic in that they are hard to decompose and may cause water pollution, so that their use is restricted.

Moreover, aromatic cyclic ethers are expensive and liable to form peroxides. Accordingly, it would be desirable to develop a process for the preparation of a polycarbodiimide solution by using a general-purpose solvent (i.e., xylene or toluene) which is easy to handle and exerts little influence on the environment.

SUMMARY OF THE INVENTION

An object of the present invention is to provide a process for the preparation of a polycarbodiimide solution by using an inexpensive general-purpose solvent. Specifically, Amano et al. and Imashiro et al. insist that, when a chlorinated aliphatic compound is used as solvent in the preparation of polycarbodiimide, the resulting polycarbodiimide can exist stably in the form of a solution until it reaches a high-molecular-weight region. However, as shown in the reference examples which will be given later, the present inventors have recognized that, unless the reaction conditions are carefully controlled, a product similar to the formed by carrying out the reaction in a hydrocarbon solvent as described above may be yielded and it is hence difficult to obtain polycarbodiimide in the form of a solution.

As a result of intensive investigation on the reaction conditions, the present inventors have now found that, in order to obtain polycarbodiimide in the form of a stable solution, it is the most important requisite to control its number-average molecular weight. The present invention has been completed on the basis of this finding. Specifically, the present inventors have investigated a process for the preparation of polycarbodiimide in solution form, by controlling the reaction conditions while using toluene or xylene that is widely used as a general-purpose solvent. That is, they have examined various factors involved in the reaction so that the polycarbodiimide will not form an insoluble and infusible solid and have the highest possible molecular weight, and have now found that the concentration of the organic diisocyanate, the amount of catalyst used, the reaction temperature and the reaction time are important, thereby completing the present invention.

According to the present invention, there is provided a process for the preparation of a polycarbodiimide solution wherein polycarbodiimide is synthesized by heating an organic diisocyanate in the presence of a carbodiimidation catalyst, characterized in that a non-chlorinated aromatic hydrocarbon is used as solvent and the resulting polycarbodiimide has a number-average molecular weight in the range of 3,000 to 10,000.

In one preferred embodiment of the present invention, the aforesaid organic diisocyanate is 2,4-tolylene diisocyanate alone or a mixture of 2,4-tolylene diisocyanate and 2,6-tolylene diisocyanate, and the aforesaid non-chlorinated aromatic hydrocarbon solvent is toluene or xylene.

The organic diisocyanate used in the present invention may comprise, for example, 2,4-tolylene diisocyanate alone or a mixture of 2,4-tolylene diisocyanate and 2,6-tolylene diisocyanate. This organic diisocyanate is used at a concentration of 1 to 20% (w/v), preferably 5 to 15% (w/v), based on the solvent.

The solvent used in the present invention comprises a non-chlorinated aromatic compound, and specific examples thereof include toluene, xylene, ethylbenzene and cumene. Among others, toluene and xylene are preferred.

No particular limitation is placed on the type of the carbodiimidation catalyst used, so long as it contains neither unreacted organic diisocyanate nor by-products and has high stability in itself. The compounds which meet these requirements include, for example, cyclic phosphine oxides such as 1-phenyl-2-phospholene-1-oxide, 3-methyl-2-phospholene-1-oxide and 3-methyl-1-phenyl-3-phospholene-1-oxide. Among them, 3-methyl-1-phenyl-3-phospholene-1-oxide is preferred. Preferably, 3-methyl-1-phenyl-3-phospholene-1-oxide is added in an amount of 0.05 to 0.20 mol % based on the organic diisocyanate.

The reaction temperature greatly influences the molecular weight of the product. In order to control the molecular weight easily, it is necessary to use a reaction temperature of 100° to 120° C. and preferably 110° to 120° C. A solution of polycarbodiimide with a number-average molecular weight in the range of 3,000 to 10,000 can be obtained by heating the reaction mixture under the above-described conditions for 2 to 4 hours.

If these reaction conditions (i.e., reaction temperature, catalyst concentration and reaction time) exceed the aforesaid respective upper limits, the resulting polycarbodiimide will have a number-average molecular weight greater than 10,000 and precipitate as an insoluble and infusible solid. If they fall below the respective lower limits, the resulting polycarbodiimide will have a number-average molecular weight less than 3,000 and show a marked reduction in film-forming properties and strength. The preferred range of its number-average molecular weight is from 6,000 to 10,000.

Moreover, if the concentration of the organic diisocyanate in the solvent is less than 1% (w/v), this is not desirable from an economic point of view and the polymerization rate will be reduced. If it is greater than 20% (w/v), the gelation or the precipitation of a solid may be observed. As can be seen from these facts, even when a non-chlorinated solvent is used, a solution of polycarbodiimide with a number-average molecular weight in the range of 3,000 to 10,000 can be obtained by controlling certain polymerization conditions.

According to the present invention, polycarbodiimide with a number-average molecular weight adjusted to the range of 3,000 to 10,000 can be obtained in the form of a solution by carefully controlling the concentration of the organic diisocyanate, the amount of the catalyst used, the reaction temperature and the reaction time. Moreover, by preparing a polycarbodiimide solution while using a general-purpose solvent such as toluene or xylene, the problem of environmental protection can be met and a cost reduction can be achieved on an industrial scale.

DETAILED DESCRIPTION OF THE PREFERRED EMBODIMENTS

The present invention is further illustrated by the following examples, reference examples and comparative examples.

EXAMPLE 1

Figure 1:
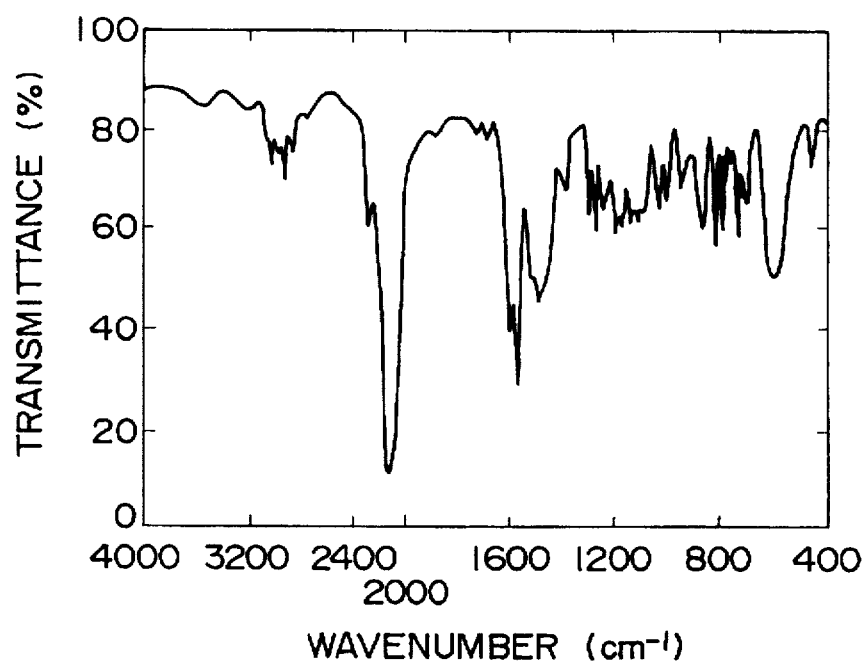
FIG. 1 is a graph showing the infrared absorption spectrum of the polycarbodiimide obtained by using toluene as solvent and carrying out the polymerization reaction at its reflux temperature.

A 100 ml three-necked flask was charged with 5.40 g of tolylene diisocyanate containing 2,4- and 2,6-isomers in a ratio of 80:20 (hereinafter abbreviated as "TDI-80") and 50 ml of toluene. After mixing, 3-methyl-1-phenyl-3-phospholene-1-oxide (hereinafter abbreviated as "MPPO") was added thereto in an amount of 0.20 mol % based on the organic diisocyanate. While being stirred under an atmosphere of nitrogen, this solution was heated from room temperature to the reflux temperature (110° C.) over a period of 15 minutes and held at the reflux temperature for 4 hours. Upon cooling to room temperature, a pale-yellow clear solution was obtained. The infrared absorption spectrum (hereinafter abbreviated as "IR") of the polycarbodiimide so formed showed strong absorption due to the carbodiimide linkage at 2142 cm$^{-1}$, and only a trace amount of absorption due to the isocyanate linkage of the starting material (at 2272 cm$^{-1}$) was recognized (FIG. 1). Analysis by gel permeation chromatography (hereinafter abbreviated as "GPC") using polystyrene as standard reference material revealed that the number-average molecular weight of the resulting polycarbodiimide was 9,900.

Reference Examples 1 and 2

Figure 3:
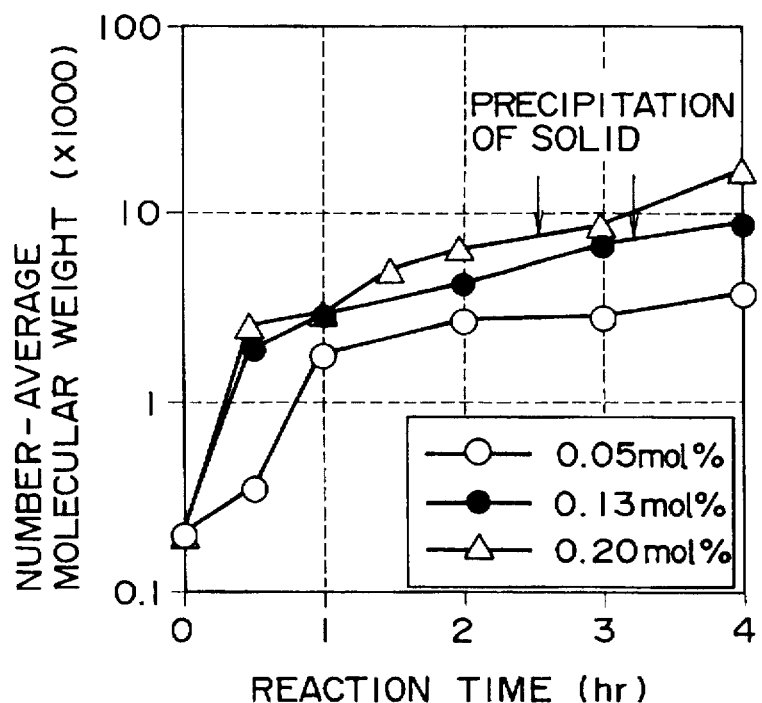
FIG. 3 is a graph showing changes with time of the number-average molecular weight of the polycarbodiimide formed when xylene was used as solvent and the catalyst concentration was 0.05, 0.13 or 0.20 mol % based on TDI-80.
Figure 4:
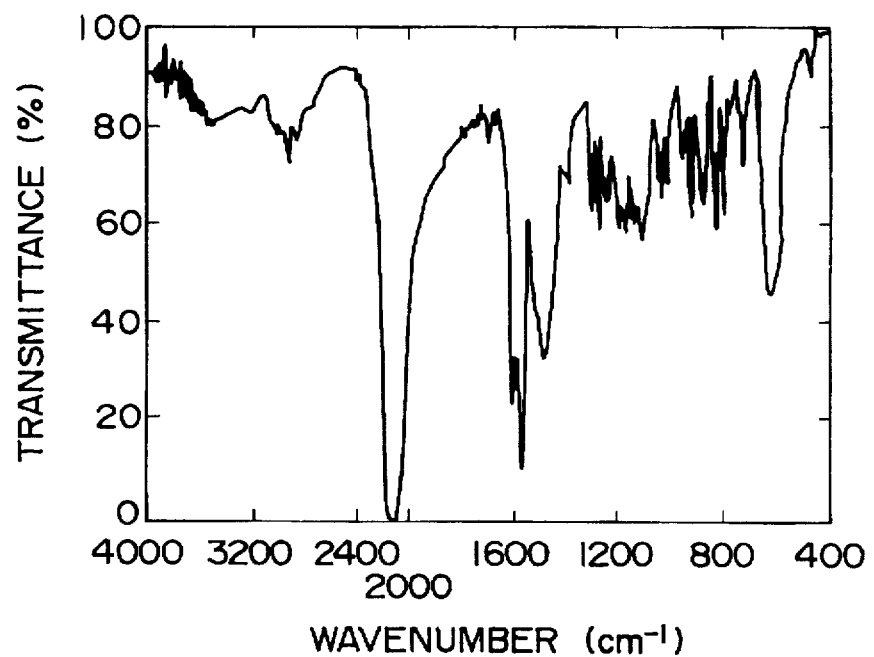
FIG. 4 is a graph showing the infrared absorption spectrum of the polycarbodiimide obtained by using tetrachloroethylene as solvent and carrying out the polymerization reaction at its reflux temperature.

According to the process disclosed by Amano et al., polycarbodiimide was synthesized by using a chlorinated aliphatic compound as solvent. Specifically, a 100 ml three-necked flask was charged with 5.40 g of TDI-80, 0.20 mol % of MPPO, and 50 ml of tetrachloroethylene. While being stirred under an atmosphere of nitrogen, this solution was heated from room temperature to the reflux temperature (121° C.) over a period of 15 minutes and held at the reflux temperature for 4 hours. Upon cooling to room temperature, a colorless clear solution was obtained. The IR of the polycarbodiimide so formed showed strong absorption due to the carbodiimide linkage, and the absorption due to the isocyanate linkage disappeared completely (FIG. 3). Analysis by GPC revealed that the number-average molecular weight of the resulting polycarbodiimide was 16,700. This experiment is regarded as Reference Example 1.

Moreover, 50 ml of 1,1,2,2-tetrachloroethane with a higher boiling point was used as solvent. TDI-80 and MPPO were added thereto in the same amounts as described above, and this solution was reacted at the reflux temperature (146° C.). The solution gelled 145 minutes after the temperature rise, resulting in the precipitation of a rubber-like elastomer. This experiment is regarded as Reference Example 2.

It can be seen from the foregoing Reference Examples 1 and 2 that, when tetrachloroethylene was used as solvent, polycarbodiimide with a molecular weight of 16,700 could be formed in the form of a stable solution. However, when 1,1,2,2-tetrachloroethane with a higher boiling point was used as solvent and reaction was carried out under reflux conditions, an insoluble and infusible solid precipitated.

Comparative Examples 1 and 2

A 100 ml three-necked flask was charged with 5.40 g of TDI-80, 0.20 mol % of MPPO, and 50 ml of xylene. While being stirred under an atmosphere of nitrogen, this solution was heated from room temperature to the reflux temperature (132° C.) over a period of 15 minutes and held at the reflux temperature. The solution became turbid 110 minutes after the temperature rise, and several masses of polycarbodiimide with a diameter of about 1 cm precipitated in 120 minutes. This solid polycarbodiimide was insoluble in tetrachloroethylene, hexane, dimethyl sulfoxide and tetrahydrofuran. This experiment is regarded as Comparative Example 1.

Moreover, 50 ml of decalin was used as solvent. TDI-80 and MPPO were added thereto in the same amounts as described above, and this solution was reacted at the reflux temperature (185° C.). The precipitation of a solid was observed 10 minutes after the temperature rise. This experiment is regarded as Comparative Example 2.

The results of Comparative Examples 1 and 2 are summarized in Table 1.

TABLE 1

Results of polymerization at the reflux temperatures of xylene and decalin

| | Solvent | Catalyst concentration | Reaction temperature | Average molecular weight | Time for precipitation of solid |
|---|---|---|---|---|---|
| Comparative Example 1 | Xylene | 0.20 mol % | 132° C. | Not measured | 110 minutes |
| Comparative Example 2 | Decalin | 0.20 mol % | 185° C. | Not measured | 10 minutes |

EXAMPLES 2-4

Figure 2:
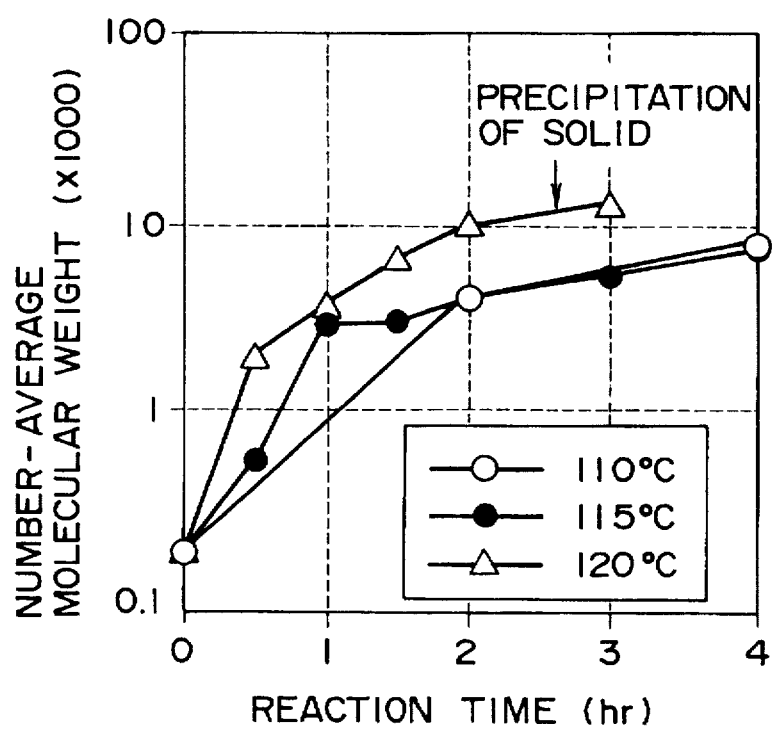
FIG. 2 is a graph showing changes with time of the number-average molecular weight of the polycarbodiimide formed when xylene was used as solvent and the polymerization reaction was carried out at a temperature of 110° C., 115° C. or 120° C.

A 100 ml three-necked flask was charged with 5.40 g of TDI-80, 0.20 mol % of MPPO, and 50 ml of xylene. While being stirred under an atmosphere of nitrogen, this solution was heated at a predetermined reaction temperature for 4 hours. The reaction temperature was 110° C. in Example 2, 115° C. in Example 3, and 120° C. in Example 4. The relationship between reaction time and number-average molecular weight as observed at the respective reaction temperatures of Examples 2-4 is shown in FIG. 2. As to the number-average molecular weight after the precipitation of an insoluble and infusible solid, the values given therein are lower than the actual molecular weights because only a tetrahydrofuran-soluble fraction was analyzed. When the solution was reacted at 110° C. or 115° C., a pale-yellow clear, homogeneous solution was obtained. The number-average molecular weight of the resulting polycarbodiimide was 7,500 or 6,800, respectively. On the other hand, when the solution was reacted at 120° C., it became turbid 160 minutes after the temperature rise, and several masses of polycarbodiimide with a diameter of about 1 cm precipitated in 180 minutes. The tetrahydrofuran-soluble fraction of the polycarbodiimide obtained after 180 minutes of reaction had a number-average molecular weight of 12,600. The results of Examples 2-4 are summarized in Table 2. As shown in FIG. 2, the molecular weight of polycarbodiimide could be adjusted to a preferred range by controlling the reaction time, thus making it possible to obtain polycarbodiimide in solution form.

TABLE 2

Results of polymerization at varying reaction temperatures

| | Solvent | Catalyst concentration | Reaction temperature | Average molecular weight | Time for precipitation of solid |
|---|---|---|---|---|---|
| Example 2 | Xylene | 0.20 mol % | 110° C. | 7,500 | No precipitation |
| Example 3 | Xylene | 0.20 mol % | 115° C. | 6,800 | No precipitation |
| Example 4 | Xylene | 0.20 mol % | 120° C. | 12,600 | 160 minutes |

EXAMPLES 5-7

A 100 ml three-necked flask was charged with 5.40 g of TDI-80, a predetermined amount of MPPO, and 50 ml of xylene. The amount of MPPO was 0.05 mol % in Example 5, 0.13 mol % in Example 6, and 0.20 mol % in Example 7. While being stirred under an atmosphere of nitrogen, this solution was heated at 120° C. for 4 hours. The relationship between reaction time and number-average molecular weight as observed with the respective amounts of MPPO added is shown in FIG. 3. As to the number-average molecular weight after the precipitation of an insoluble and infusible solid, the values given therein are lower than the actual molecular weights because only a tetrahydrofuran-soluble fraction was analyzed. When 0.05 mol % of MPPO was added, no precipitation of polycarbodiimide was observed and the solution remained homogeneous even after the completion of the reaction. The number-average molecular weight of the resulting polycarbodiimide was 3,600. On the other hand, when 0.13 mol % or 0.20 mol % of MPPO was added, polycarbodiimide precipitated in 190 minutes or 160 minutes, respectively. The tetrahydrofuran-soluble fraction of the polycarbodiimide obtained after 240 minutes of reaction had a number-average molecular weight of 8,600 or 16,700, respectively. The results of Examples 5-7 are summarized in Table 3. As shown in FIG. 3, the molecular weight of polycarbodiimide could be adjusted to a preferred range by controlling the reaction time, thus making it possible to obtain polycarbodiimide in solution form.

TABLE 3

Results of polymerization at varying catalyst concentrations

| | Solvent | Catalyst concentration | Reaction temperature | Average molecular weight | Time for precipitation of solid |
|---|---|---|---|---|---|
| Example 5 | Xylene | 0.05 mol % | 120° C. | 3,600 | No precipitation |
| Example 6 | Xylene | 0.13 mol % | 120° C. | 8,600 | 130 minutes |
| Example 7 | Xylene | 0.20 mol % | 120° C. | 16,700 | 140 minutes |

It can be seen from the results of the foregoing examples and comparative examples that the number-average molecular weight of polycarbodiimide can be adjusted to a range of 3,000 to 10,000 by using toluene or xylene as solvent and carrying out the reaction at a catalyst concentration of 0.05 to 0.20 mol % and a reaction temperature of 100° to 120° C., preferably 110° to 120° C., for a reaction time of 2 to 4 hours, thus making it possible to obtain polycarbodiimide in the form of a solution.

We claim:

1. A process for the preparation of a polycarbodiimide solution wherein polycarbodiimide is synthesized by heating an organic diisocyanate in the presence of a carbodiimidation catalyst, characterized in that a non-chlorinated aromatic hydrocarbon is used as solvent and the resulting polycarbodiimide has a number-average molecular weight from about 3,000 to about 10,000.

2. A process for the preparation of a polycarbodiimide solution according to claim 1 wherein the organic diisocyanate is 2,4-tolylene diisocyanate alone or a mixture of 2,4-tolylene diisocyanate and 2,6-tolylene diisocyanate, and the non-chlorinated aromatic hydrocarbon solvent is toluene or xylene.

3. The process of claim 1 wherein the number-average weight is from about 6,000 to about 10,000.

4. The process of claim 1 wherein the synthesis is carried out at a temperature in the range from 100° to 120° C.

5. The process of claim 1 wherein the concentration of organic diisocyanate to solvent is from 1 to 20 w/v %.

6. The process of claim 1 wherein the concentration of the catalyst is from 0.05 to 0.2 mol %.

7. The process of claim 1 wherein the solvent is selected from the group consisting of toluene, xylene, ethylbenzene and cumene.

* * * * *